(12) United States Patent
Sgroi

(10) Patent No.: US 10,099,620 B1
(45) Date of Patent: Oct. 16, 2018

(54) SAFETY STEP ON A HITCH RECEIVER FOR A TRUCK

(71) Applicant: Nunzio Biagio Sgroi, Cottonwood, ID (US)

(72) Inventor: Nunzio Biagio Sgroi, Cottonwood, ID (US)

( * ) Notice: Subject to any disclaimer, the term of this patent is extended or adjusted under 35 U.S.C. 154(b) by 0 days.

(21) Appl. No.: 15/674,792

(22) Filed: Aug. 11, 2017

(51) Int. Cl.
*B60R 3/00* (2006.01)

(52) U.S. Cl.
CPC ...................................... *B60R 3/00* (2013.01)

(58) Field of Classification Search
CPC ................ B60R 3/00; B60R 9/06; B60D 1/58
See application file for complete search history.

(56) References Cited

U.S. PATENT DOCUMENTS

| | | | |
|---|---|---|---|
| 3,580,613 A | | 5/1971 | Northrop |
| 3,730,556 A | | 5/1973 | Aldape et al. |
| D264,697 S | | 6/1982 | Monteith |
| D372,892 S | | 8/1996 | McCoy et al. |
| 5,738,362 A | * | 4/1998 | Ludwick .................. B60R 3/02 280/166 |
| 5,803,475 A | | 9/1998 | Dick |
| D424,990 S | | 5/2000 | McCoy et al. |
| D433,357 S | | 11/2000 | McCoy et al. |
| 6,145,865 A | | 11/2000 | Cannara et al. |
| 6,170,843 B1 | | 1/2001 | Maxwell et al. |
| D451,060 S | | 11/2001 | McCoy et al. |
| 6,682,086 B1 | | 1/2004 | Erickson |
| 6,685,204 B1 | | 2/2004 | Hehr |
| 6,814,366 B2 | | 11/2004 | McCoy et al. |
| 6,971,663 B1 | * | 12/2005 | Blake ....................... B60D 1/60 280/155 |
| 6,994,362 B2 | | 2/2006 | Foster |
| D527,323 S | * | 8/2006 | Storer .......................... D12/203 |
| 7,100,936 B1 | * | 9/2006 | Cheng .................... B60D 1/485 280/491.5 |
| 7,185,904 B1 | | 3/2007 | Jones et al. |
| 7,490,889 B1 | | 2/2009 | Scoggins |
| 7,661,693 B1 | | 2/2010 | Lipski |
| 7,775,536 B2 | | 8/2010 | Shumway |

(Continued)

OTHER PUBLICATIONS

Internet and Amazon TM Photos, of MaxxHaul Hitch Extender with Step, at least as early as Oct. 2012.

(Continued)

*Primary Examiner* — Brian L Swenson
(74) *Attorney, Agent, or Firm* — Pedersen and Company, PLLC; Ken J. Pedersen; Barbara S. Pedersen

(57) ABSTRACT

A step accessory for a receiver hitch for climbing into a truck bed. A step plate connected to the bottom of the receiver tube does not enter into or block the interior space of the receiver tube. The step plate is directly attached to the receiver tube, but not the bumper, the truck, the ball unit, or the tongue of a towed vehicle/trailer. The step plate extends horizontally and transversely to the longitudinal axis of the truck, centered relative to the right and left sides of the truck. Preferably, the step plate does not extend rearward of the opening of the receiver, or above the bottom surface of the receiver tube. The step plate extends under the bumper, distanced from the bottom of the bumper, to provide a toe space, resulting in a safe and stable position for the user's foot to prevent slips and falls.

23 Claims, 8 Drawing Sheets

(56) References Cited

U.S. PATENT DOCUMENTS

| | | | |
|---|---|---|---|
| 8,251,387 B2 | 8/2012 | Gansberger | |
| 8,919,796 B2 | 12/2014 | Masanek et al. | |
| 9,487,146 B1* | 11/2016 | Lowell | B60R 3/007 |
| 2001/0045720 A1* | 11/2001 | Schlicht | B60R 3/02 |
| | | | 280/166 |
| 2003/0116938 A1 | 6/2003 | Shields et al. | |
| 2004/0160034 A1 | 8/2004 | Mitchell | |
| 2005/0093272 A1 | 5/2005 | Adams | |
| 2007/0267842 A1 | 11/2007 | Seibert et al. | |
| 2008/0042394 A1 | 2/2008 | Park et al. | |
| 2008/0067775 A1 | 3/2008 | Dicarlo et al. | |
| 2008/0217885 A1* | 9/2008 | Woolever | B60D 1/363 |
| | | | 280/477 |
| 2009/0079157 A1 | 3/2009 | Fratzke | |
| 2009/0243249 A1 | 10/2009 | Arvanites | |
| 2012/0299266 A1* | 11/2012 | Gordon | B60D 1/58 |
| | | | 280/163 |
| 2013/0270791 A1* | 10/2013 | Anderson | B60R 3/007 |
| | | | 280/163 |
| 2015/0175079 A1 | 6/2015 | Kmita et al. | |

OTHER PUBLICATIONS

Internet and Amazon TM Photos, of Reese Towpower Tow and Go Hitch Step, at least as early as Aug. 2013.

* cited by examiner

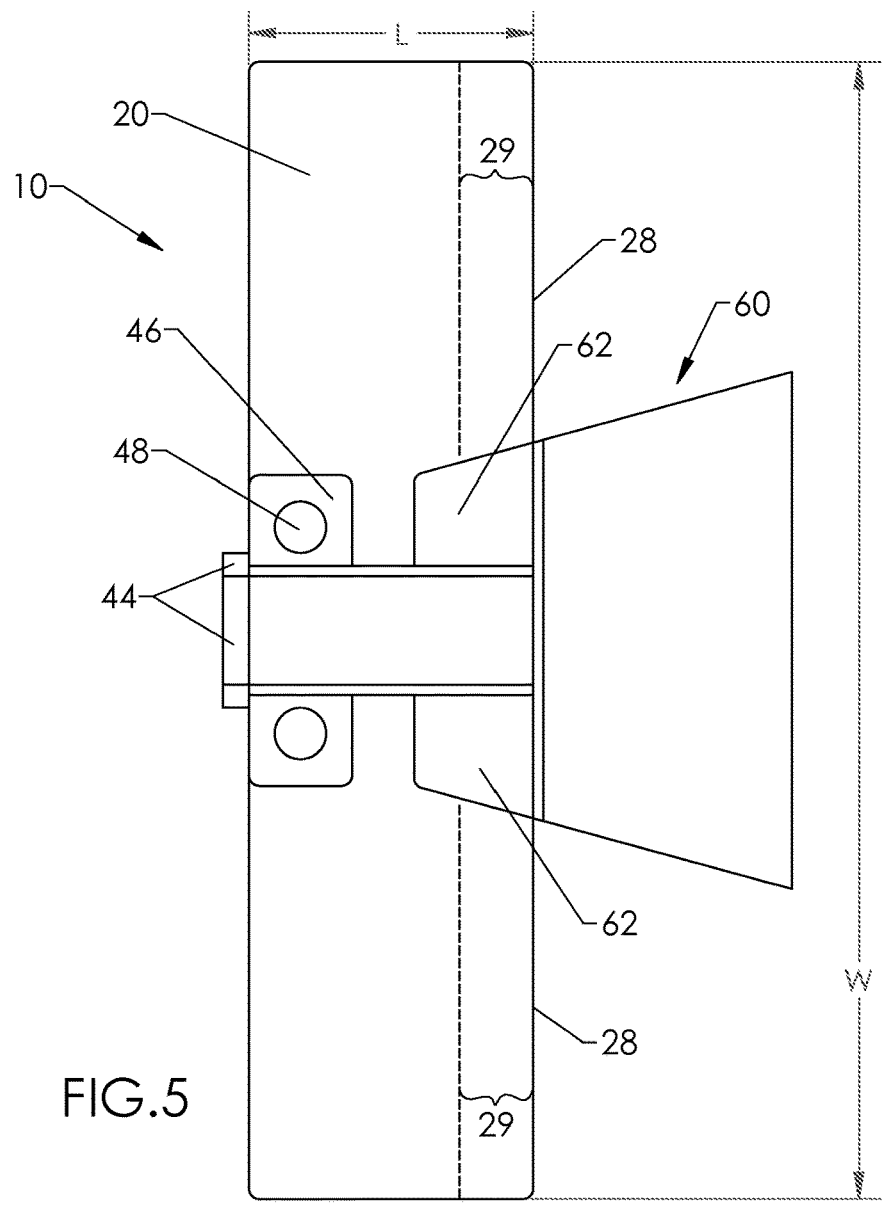
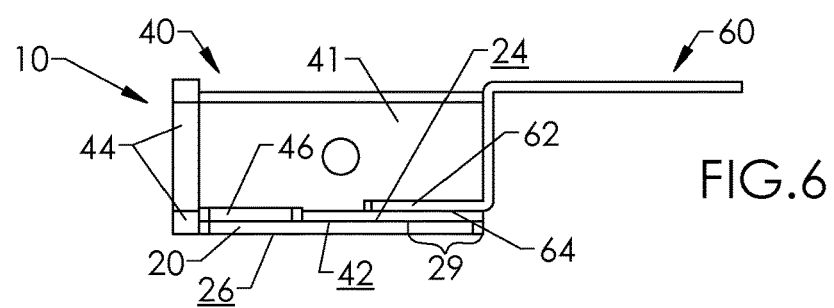

SAFETY STEP ON A HITCH RECEIVER FOR A TRUCK

BACKGROUND

Field of the Technology

The invention relates to accessories for a truck with a truck bed and a towing hitch. More specifically, the invention relates to a step accessory for allowing a person to safety and easily step up into, and down from, the truck bed. The preferred step accessory is connected to, or integral with, the towing hitch receiver, but does not extend into, or block use or, the receiver, so that the receiver is usable for its intended purpose without moving or removing, and without interference from, the step accessory. Further, the preferred step accessory is only connected/attached to the receiver tube of the hitch, and not to the bumper of the truck, not to the ball unit, and not to the tongue or any part of a towed vehicle/trailer.

Related Art

A pickup truck is typically used for hauling tools, equipment and supplies that the driver or another user wants to access, remove, use and replace, frequently. The user is often not able to reach and lift items in the truck bed by leaning over the side or back end of the truck bed when standing on the ground, due to the size and height of the truck bed, and/or size and weight of the item. Therefore, the user frequently climbs into the truck bed and frequently does so when the tailgate is closed. To do this, the user typically steps with one foot on top of the prior art (conventional) narrow receiver tube of the hitch, or the narrow truck bumper, and then swings the other foot/leg into the truck bed over the tailgate. However, many pickup truck users have fallen while doing this, because it is common for the user's shoe/boot to slip off the receiver tube or bumper, and/or because this clumsy climbing maneuver otherwise ends up with the user falling to the ground and/or against the truck. Because the inventor once fell backward to the ground when attempting this conventional step-on-the-receiver-or-bumper climb, he knows from experience that the current equipment and hitch systems of a pickup truck can result in dangerous falls and serious injuries including head and back injuries.

Many devices in the patent literature aim at providing a step for assisting a person to climb up into a truck bed. For example, the patent literature describes steps that each have an elongated support member that stabs axially into the receiver tube of the towing hitch, in place of the conventional stab-in towing ball unit or other towing connection member. See, for example, U.S. Pat. Nos. 6,170,843; 8,251,387; 8,919,796; and 2009/0243249 A1. This way, steps are connected to the truck in place of towing equipment, and the vehicle is incapacitated for towing when the step is in place. Therefore, the step must be removed each time the user wants to tow. U.S. Pat. No. 6,170,843 further shows an alternative step embodiment, extending far out to one side of the rear end of the truck, by attachment directly to the stab-in ball unit and not to the receiver.

Other steps systems provide a step unit far out to a side/corner of the truck bed, by the step elongated support member stabbing transversely into the square tubular end of a receiver cross/transverse tube. See Publication No. 2008/0067775 A1. Also, some steps systems place a step far out to a side/corner of the truck bed by the step comprising a complicated bar/extension system that extends transversely away from the longitudinal centerline of the truck and truck bed. See U.S. Pat. No. 6,994,362. Both types of transverse/corner steps fail to provide step/climbing capability at or near the center of the rear of the truck and they use complex and cumbersome structures.

Other step systems are inserted axially into the receiver and include both a towing ball and a step. However, such systems require pivoting, swinging, or other adjustment or movement of the step to an out-of-the-way position, away from the ball, to allow access and connection of the tongue to the ball for towing. See, for example, U.S. Pat. Nos. 3,580,613; 6,682,086; and 7,661,693.

Other step systems do not extend into the rectangular rear opening of the receiver tube, but are connected by utilization of the transverse holes through the receiver and so interfere with the receiver tube being used for its intended towing purpose as long as the step in installed. See, for example, U.S. Pat. No. 6,1454,864, wherein bolts/pins are installed through the receiver tube transverse holes, to connect the step to the receiver tube in a way that the bolts/pins block the receiver tube from being used for towing.

Another example of a step for a pickup bed is the type that extends vertically up from the top of the receiver, for example, Design Pat. Nos. D372,892, and D451,060. These have limited utility and/or provide little safety enhancement relative to stepping on a conventional truck bumper.

Objects of the preferred embodiments include providing a step accessory, for climbing into the rear of the truck bed, that is safe, convenient, effective, simple in structure and to use, without moving parts and other adjustment complexity, and without interfering or blocking use of the towing equipment. Preferably, the step accessory places a step directly below, and connected to or part of, the receiver tube, at and very near to the longitudinal centerline of the truck on which it is installed.

SUMMARY

The invention is a step accessory for a receiver, and/or its method of manufacturing, attachment, and/or use of the accessory, that provides a step for climbing into the bed of a truck from the back of the truck at or near the towing hitch. The step accessory is preferably embodied as a step and hitch receiver assembly comprising a step plate that is connected to the bottom of the receiver, so that it does not enter into, or have any portion that blocks or even partially blocks, the tubular interior space of the receiver. Further, the step plate is only attached to the receiver of the hitch, not to the bumper of the truck, not to a ball unit connected to the receiver, and not to the tongue or other part of a towed vehicle/trailer.

The step plate is preferably a single step plate that extends horizontally and transversely to the longitudinal axis of the truck. The step plate preferably extends under the receiver tube, and extends out past the right and left extremities of said receiver tube about the same distance in the range of preferably 9 inches to 24 inches on each side. Preferably neither the step plate, nor any portion of the step accessory, extend rearward of the opening of the receiver tube. Preferably, no portion of the step plate extends above the bottom surface/bottom plane of the receiver tube.

The preferred single step plate may be attached to the bottom of the receiver, preferably by welding to the bottom surface of the receiver tube, especially in the case of a retrofit to an existing receiver. Or, the single step plate may be integrally formed during manufacture to be connected to and extending from the bottom of the receiver.

The preferred structure, and the installation/manufacture, of single step plate and receiver assembly is adapted so that the step extends from at or near the rear extremity of the receiver to underneath/directly-below the bumper of the vehicle. Preferably no part of the single step plate extends rearward of a vertical plane (perpendicular to the longitudinal axis of the truck) that extends through the rear extremity of the receiver.

The single step plate and its attachment to the receiver are adapted so that the top surface of the single step plate, which extends under the bumper, is distanced from the bottom of the bumper of the truck, to provide a toe space for the user. Preferably, the toe space is a vertical space of 3-5 inches, and most preferably 4 inches, between the top surface of the step plate and the bottom surface of the bumper. This preferred toe space is provided, and extends, all the way from the left side of the receiver to the left extremity edge of the step plate, and all the way from the right side of the receiver to the right extremity edge of the single step plate. In other words, the step plate is significantly distanced, at least several inches, from the bumper all the way from the left side of the receiver to the left edge of the step plate, and all the way from the right side of the receiver to the right edge of the single step plate. This way, the user can place his/her foot on one or the other of the step plate right or left portions, with the toe of the boot/shoe in the toe space. This way, the user's foot is forward enough that a substantial amount of the foot (boot/shoe) can be squarely and firmly on the step plate, and close to the rear end/tailgate of the truck, for comfortable, safe, and ergonomically-effective climbing over the tailgate. This results in a safe and stable position for the foot (boot/shoe), from which the foot is very unlikely to slip and the user is very unlikely to slip or fall.

BRIEF DESCRIPTION OF THE DRAWINGS

FIG. 5 is a top view of the step and receiver assembly of FIG. 3.

FIG. 6 is a side view of the step and receiver assembly of FIG. 3.

DETAILED DESCRIPTION OF CERTAIN EMBODIMENTS OF THE INVENTION

Figure 1:
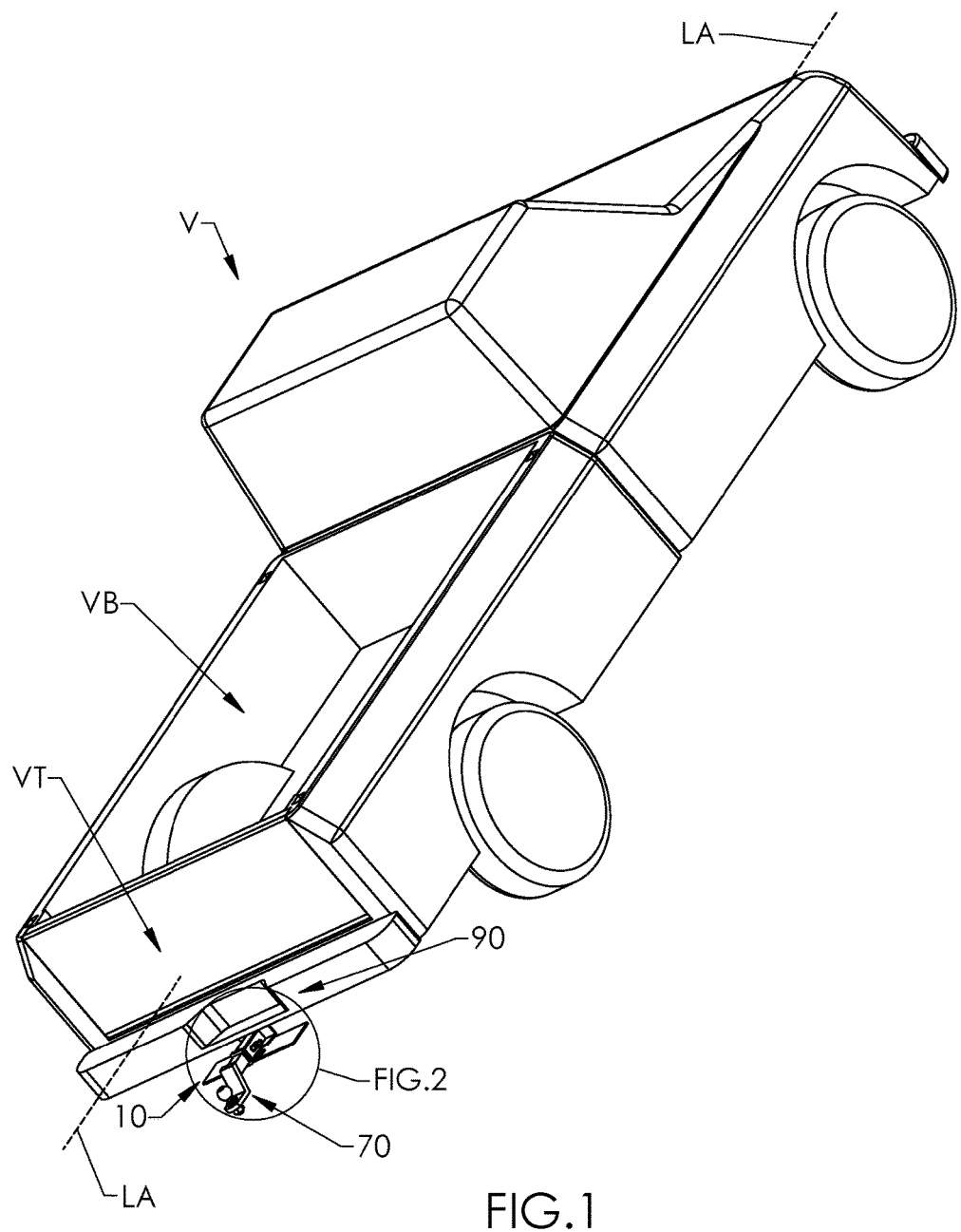
FIG. 1 is a rear perspective view of an exemplary pickup truck, with an embodiment of the invented step and receiver assembly installed on the pickup, with a conventional hitch ball unit installed in the receiver for towing.
Figure 2:
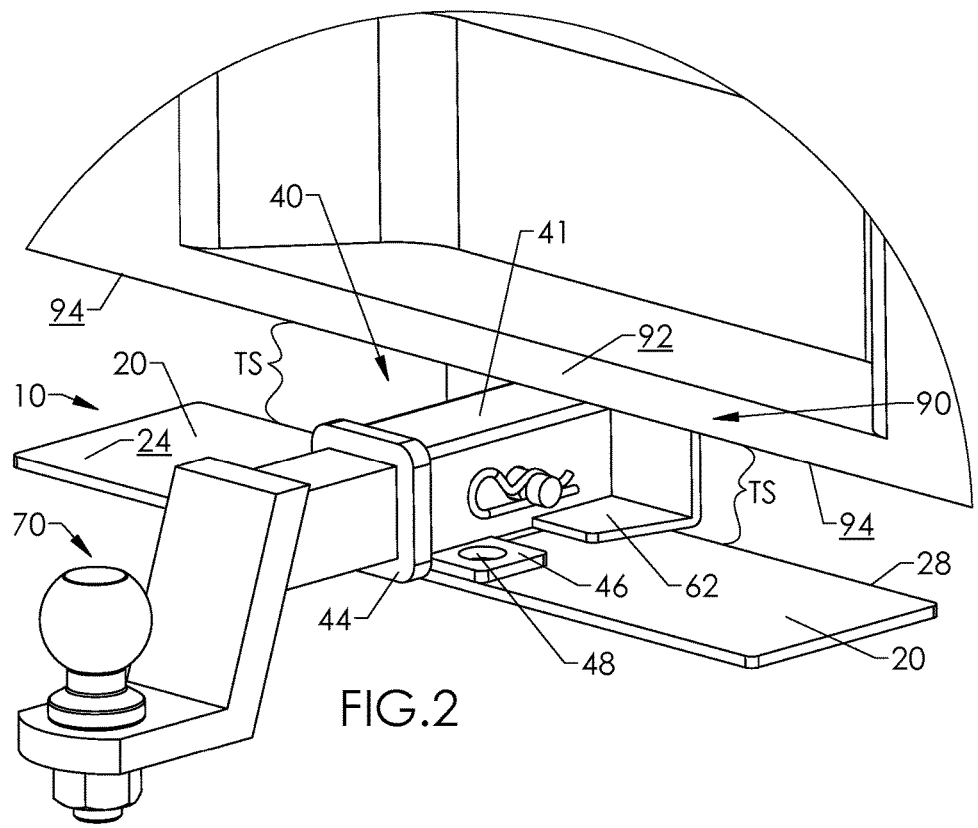
FIG. 2 is an enlargement of the detail circled in FIG. 1 showing to better advantage the embodiment of FIG. 1 with the ball unit installed therein.
Figure 3:
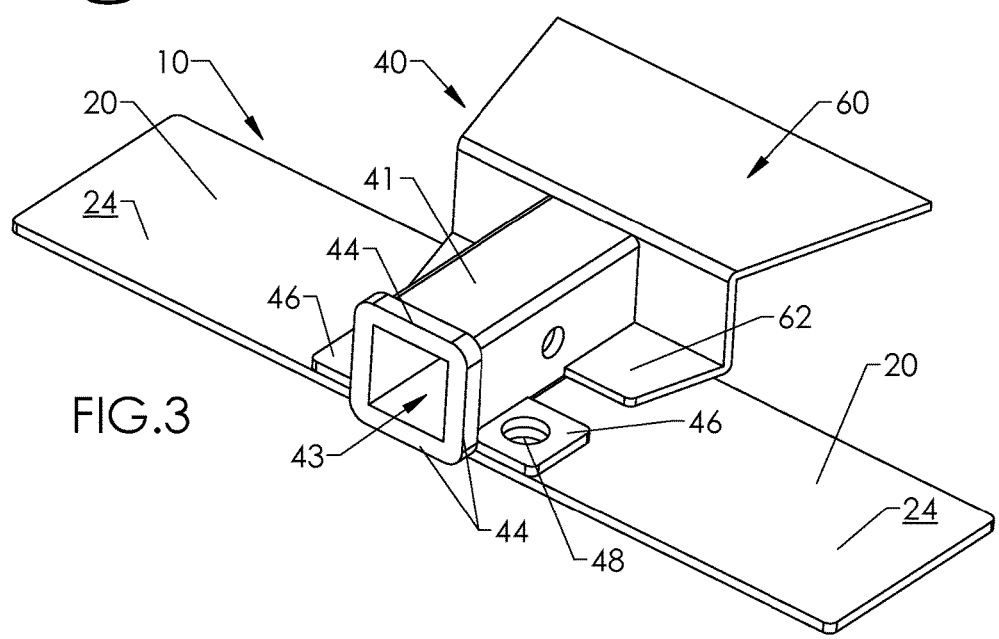
FIG. 3 is an enlargement of the detail circled in FIG. 1, with the ball unit removed from the step and receiver assembly.

Referring to the Figures, there are shown some, but not all, embodiments of the invented safety step accessory for a towing receiver of a truck or other vehicle V (hereafter, "truck" or "pick-up truck"). The preferred embodiment of the safety step and receiver assembly 10, wherein a step plate 20 is retrofit to an existing receiver unit 40, is shown in FIGS. 1-6. FIG. 1 illustrates the step and receiver assembly 10 on truck or other vehicle V, with a ball unit 70 stabbed-in to the hollow interior space of the square-cross-section, receiver tube 41. FIGS. 2 and 3 enlarge the step and receiver assembly 10, to more clearly show its structure and its relationship to the truck V and a ball unit 70 (in FIG. 2), or separately from the truck V and ball unit 70 (in FIG. 3).

The step plate 20 is fixedly and securely attached to the bottom surface 42 of the receiver tube 41 to be contacting and parallel to the bottom surface 42 of the receiver tube 41 forward of the enlarged rear rim 44 of the receiver. The plate 20 is also under, and typically contacting, the bottom surface of each of the two tabs 46, which are provided with holes 48 that receive chain-hooks or other ties extending from the towed vehicle/trailer as an extra safety precaution. The plate 20 is under, but typically not contacting, the bracket 60 that serves to connect the receiver unit 40 to the truck, typically to the vehicle frame near the bumper 90. Specifically, the plate 20 is under the lower plate 62 that is fixed to, and extends generally horizontally along-side, each side of the receiver tube 41, to secure the receiver tube 41 to the bracket 60, and hence to the truck V. The step plate 20 typically does not contact the bottom surface 64 of the lower plate 62.

For most truck positions on most ground/road surfaces, the bottom surface 42 of the receiver tube 41 will be horizontal, or generally horizontal, as will be the step plate 20. For example, it is desired that the central plane of the step plate 20 be horizontal, or slanted plus or minus 10 degrees, and more preferably plus or minus 5 degrees, from horizontal.

The step plate 20 does not enter into, or have any portion that blocks or even partially blocks, the interior space 43 of the receiver tube 41. Further, the step plate is only connected/attached to the receiver tube 41 of the hitch, not to a ball unit 70 connected to the receiver, not to the bumper 90 of the truck, and not to the tongue or any portion of a towed vehicle/trailer (not shown but known in the art).

The step plate 20 extends horizontally and transversely to the longitudinal axis LA of the truck V (FIG. 1), which extends from the front end of the truck to the back end of the truck. The step plate 20 preferably extends under the receiver tube 41, as discussed above, and extends, horizontally out past the right and left extremities of said receiver tube 41. The inventor's especially-preferred retrofit embodiment of step plate 20 is a flat metal plate, rectangular-intop-view and rectangular-in-bottom-view, that is mounted to the bottom surface of the receiver tube 41 (see FIG. 4), to extend continuously underneath the bottom surface 42 of the receiver tube 41 and sufficiently far out to each side of the tube 41 that a user can securely and safely step on the plate to climb over the tailgate TG and into the truck bed TB. The inventor prefers that the step plate 20 be welded permanently to the receiver tube 41 and/or the tabs 46 in front of the rim 44. The preferred step plate 20 extends out from the right extremity of the receiver tube 41 a distance in the range of 9-24 inches, more preferably 10-20 inches, and most preferably 12-18 inches. The preferred step plate 20 extends out from the left extremity of the receiver tube 41 a distance in the range of 9-24 inches, more preferably 10-20 inches, and most preferably 12-18 inches. Therefore, taking into account that a typical receiver tube 41 (excluding the rim 44) is about 4 inches on each side, the step plate 20 may be, for example, 22-52 inches wide W, more preferably 24-44 inches wide W, and most preferably 28-40 inches wide W. The step plate 20 is preferably 8-14 inches, or more preferably 12 inches long L (FIG. 5). The total surface area of the step plate available for receiving the user's foot is preferably more than 300 square inches, and even in the range of 300-500 square inches in some embodiments. The step plate is preferably much thinner (from top to bottom surface) than it is wide and long, for example, wherein the plate is greater than 20 times wider than thick, and the plate is greater than 10 times longer than thick.

Preferably, the step plate 20 extends rearward to, but not rearward along or past, the rear rim 44 of the receiver tube 41. See FIG. 5. Preferably neither the step plate 20, nor any portion of the invented step device, extends rearward of the opening of the receiver tube 41. Preferably no portion of the single plate 20 extends any significant distance above the bottom surface 42 or the bottom plane, of the receiver tube 41 (excluding the rim 44). For example, the single plate preferably extends above the bottom surface 42 or bottom plane of the receiver tube (excluding the rim 44) only up to ¼ of the height of the right side and left side of the receiver tube 41; for a receiver tube 41 that is 4 inches on each side, the single plate would extend at most 1 inch above the bottom surface 42/bottom plane (excluding the rim 44). More preferably, however, no part of the single plate extends above the bottom surface 42 or bottom plane (excluding the rim 44). See FIG. 6.

Preferably, the step plate 20 extends forward to place its forward edge 28 several inches forward of the rear extremity surface 92 of the bumper 90, for example, 1-5 inches forward of said surface 92. This may be understood by viewing FIG. 2, wherein one may see that most of the bracket 60, including about half of the lower plate 62 of the bracket are positioned under the bumper 90 forward of the rearmost surface 94 of the bumper. Therefore, from the top view in FIG. 5 and the side/end view in FIG. 6, one can understand that a forward edge 28 and forward portion 29 of the installed plate 20 will be underneath the bumper 90 forward from the rearmost surface 94 of the bumper. One may see to best advantage in FIG. 2 that this positioning of the plate 20, and the height of the receiver tube 41, space the plate 20 below the bumper 90, with a toe space TS between the top surface 24 of the plate 20 and the bottom surface 94 of the bumper.

The toe space TS is preferably a vertical space of 3-5 inches, but most preferably about 4 inches in keeping with the height of the typical receiver tube 41, all along the width W of the plate 20 (see FIG. 5). This way, the user can step on the plate 20 on either side of the receiver tube 41, with either foot, and the foot/shoe/boot will fit well and safety on the plate 20, with the toe in the toe space TS. This foot/shot/boot positioning relative to the plate 20, and the bumper 90 and truck V, greatly increase the chance of secure footing, and safe climbing over the tailgate TG and into the truck bed TB.

Figure 4:
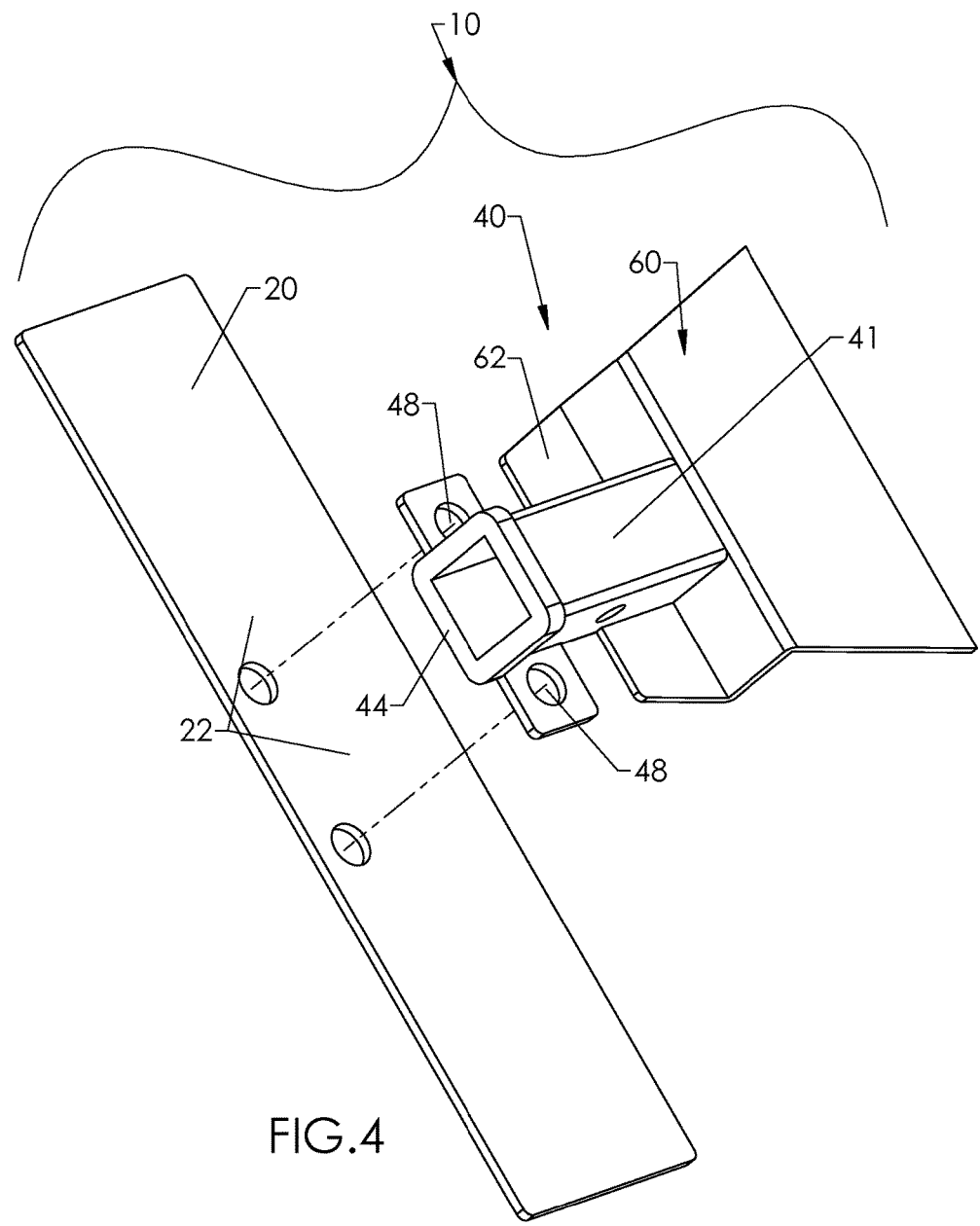
FIG. 4 is an exploded, rear top perspective view of the step and receiver assembly of FIG. 3, showing the single step plate exploded from the rest of the receiver.

As seen to best advantage in FIG. 4, the step plate 20 has two through-holes 22 from the top surface 24 of the plate 20 to the bottom surface 26 of the plate 20. When welded or otherwise installed on the receiver unit 40, through-holes 22 align with holes 48, so that the chain-hooks or other ties (not shown), extending from the towed vehicle/trailer, may hook/extend through both holes 22 and 48. This way, the retrofit step plate 20 does not interfere with the normal operation and use of the receiver hitch system.

Figure 7:
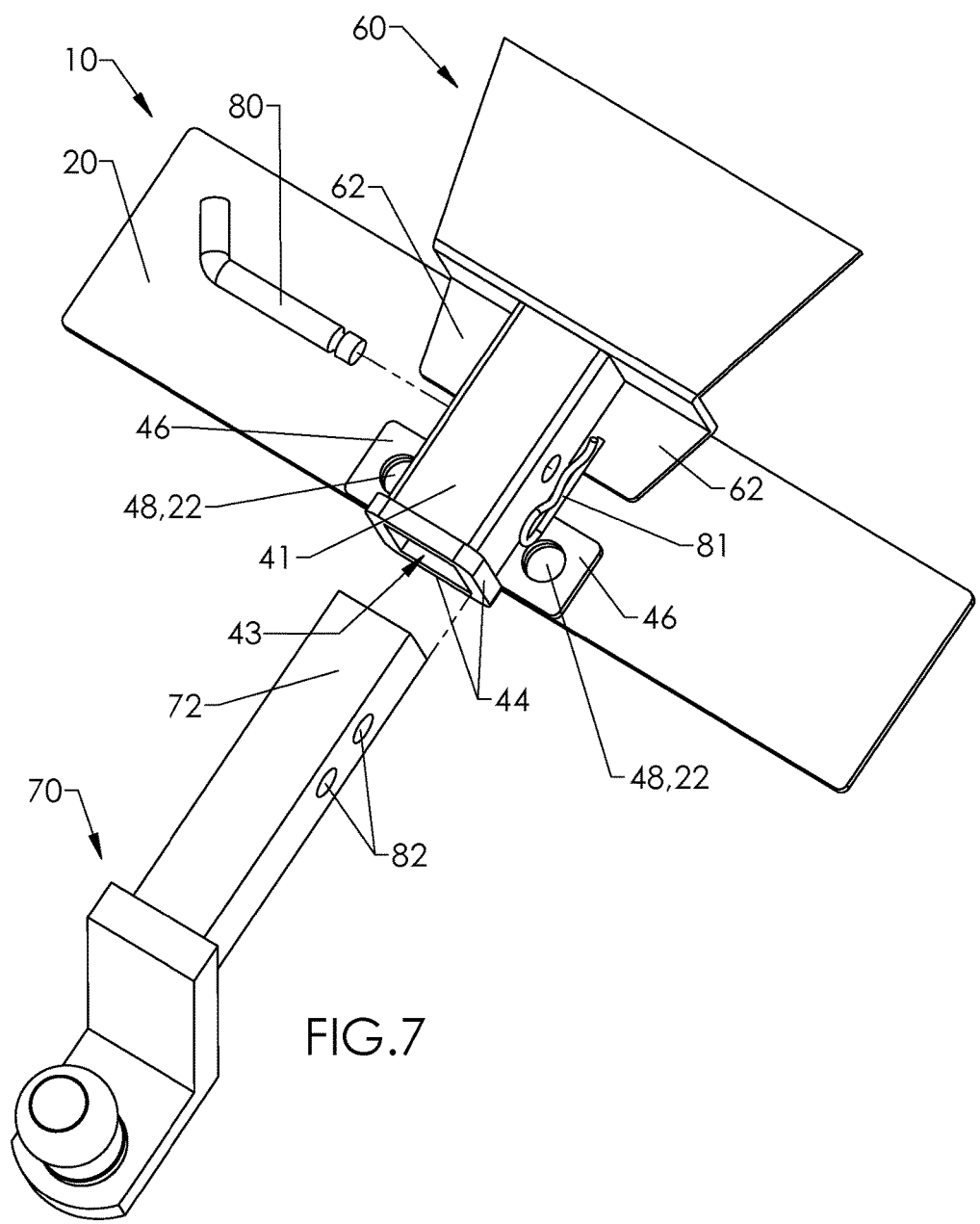
FIG. 7 is a top-rear perspective view of the step device of FIG. 3, illustrating how the ball unit can be installed in the step and receiver assembly of FIG. 3, to achieve the system shown on the truck in FIG. 1, and enlarged in FIG. 2.
Figure 8:
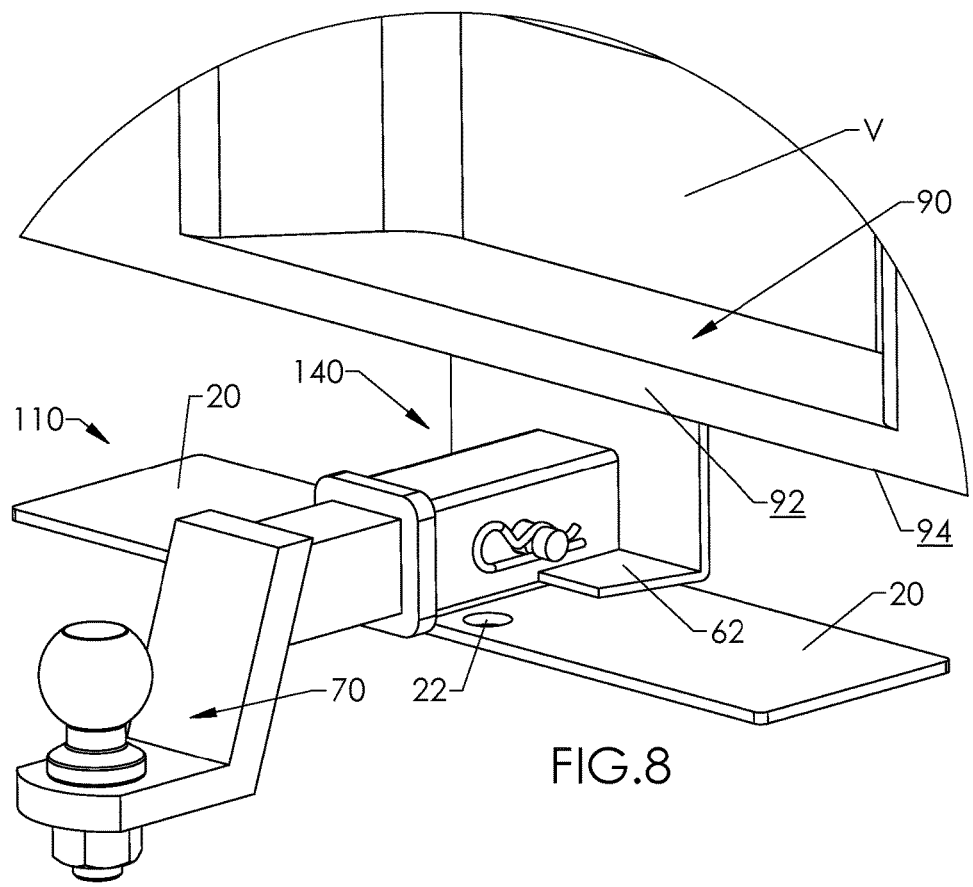
FIG. 8 is a rear perspective view of an alternative embodiment of the step and receiver assembly, installed on a truck and holding a ball unit in the receiver, wherein the step plate is formed integrally with the receiver at the time of manufacture of the receiver.
Figure 9:
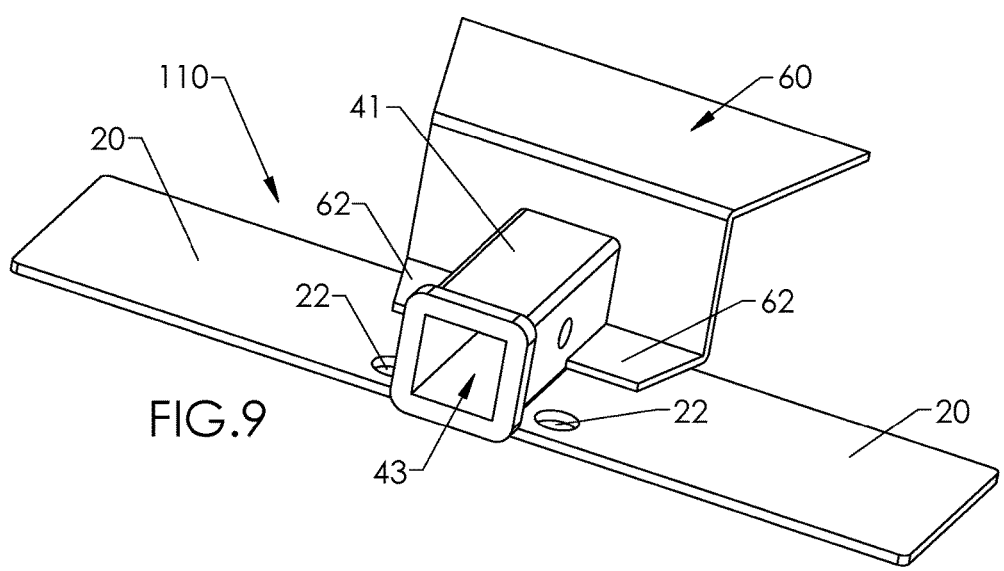
FIG. 9 is a rear perspective view of the embodiment of FIG. 8, removed from the truck and with the ball unit removed from the receiver.
Figure 10:
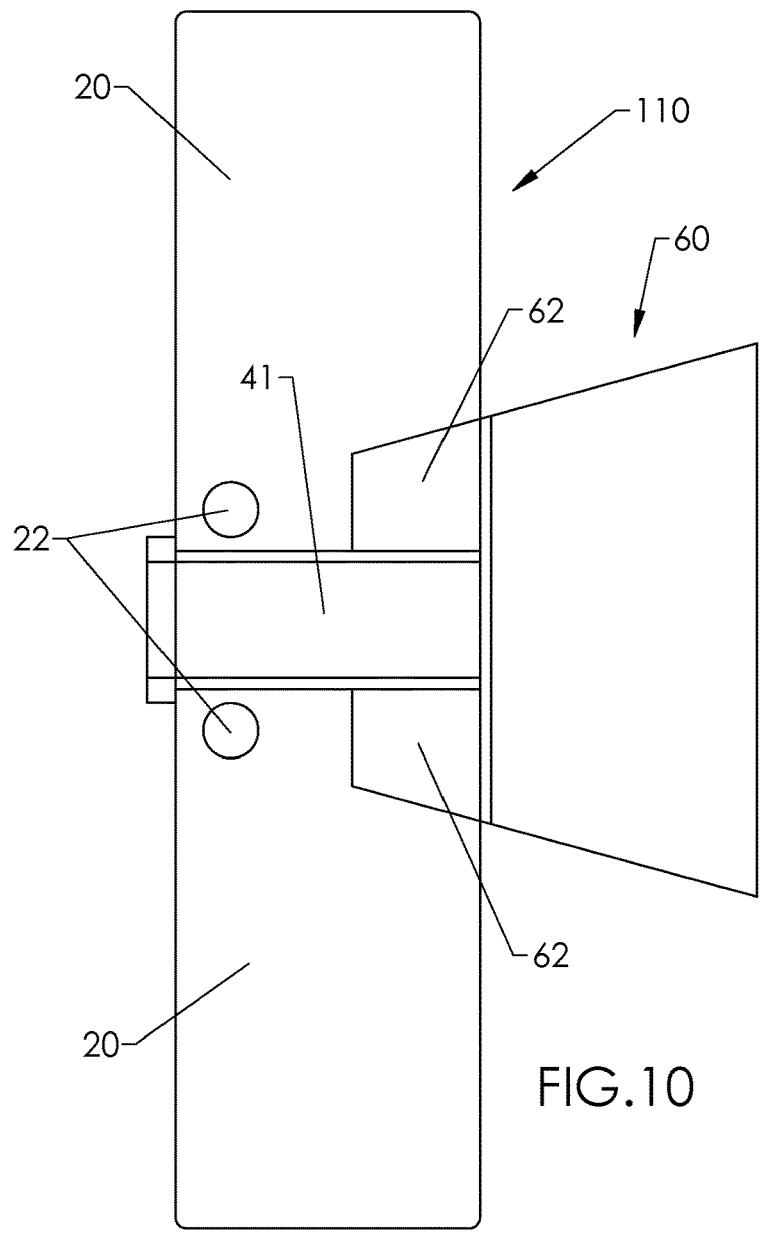
FIG. 10 is a top view of the step and receiver assembly of FIG. 9
Figure 11:
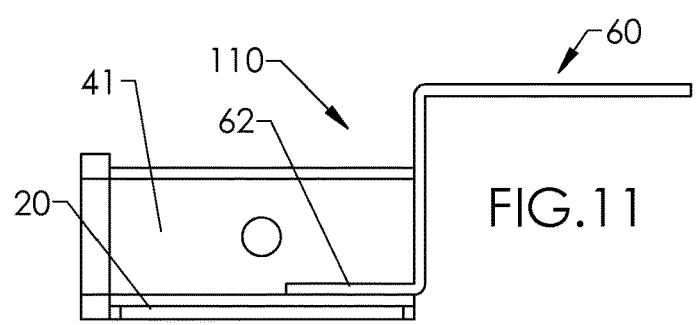
FIG. 11 is a side view of the step and receiver assembly of FIG. 9.

FIG. 7 illustrates to best advantage how the step and receiver assembly 10 is constructed, and operated separately from the ball unit 70. The ball unit 70 shaft 72 is inserted into the receiver tube interior space 43 and secured by the hitch clevis pin 80 pushed through either of holes 82 and secured by cotter pin 81, as is conventionally known and also shown in FIG. 2. Note that the step plate 20 does not contact the ball unit 70 and is not attached to the ball unit 70. The ball unit 70 can be installed, used, and removed without affecting the step plate and without requiring the step plate to be removed from the receiver unit 40. Thus, ball unit 70 installation, and later use of the ball unit 70 for towing, is not interfered with, or stopped, by the presence of the step plate 20.

Due to the positioning of the step plate 20 relative to the receiver tube 41 and its opening 43, as detailed above and as drawn in the figures, the inventor expects that many different pieces of equipment that are designed for insertion into the receiver tube 41 may be installed and used in the tube 41, without any interference from the step plate 20. Therefore, the preferred step plate 20 may remain in place at all times, including during towing, so that it is always available as a safe and stable climbing surface, preventing the need or tendency for a user to step on top of the receiver tube 41, or the bumper 90, or other narrow and/or precarious structure.

Step plate 20 in its simplest and preferred embodiment consist essentially, or consists of, a single, solid and continuous (except for two holes) plate, with a planar top surface, wherein the plate is welded, or otherwise rigidly and permanently connected, to the bottom horizontal surface of the main body of the receiver tube. While bolts or other fasteners may be used in certain embodiments for this rigid connection, this is less preferred because it might result in bolt or fastener ends that might catch, scrape, or trip a boot or shoe or other part of the user. In certain embodiments, texture for preventing slipping on the plate surface, and/or water drainage holes or channels, may be included in the step plate 20.

FIGS. 8 through 11 illustrate an alternative embodiment of the step and receiver assembly 110, wherein a similar receiver unit 140 is provided, but step plate 20 is attached to the receiver tube 141 by being formed integrally during manufacture of the receiver unit 140. This original equipment manufacture (OEM) embodiment 110 shows that the plate is still preferably located, situated, sized and used the same as embodiment 10, except the plate 20 replaces and eliminates the need for the tabs 46 and the tab holes 48. Instead, the through-holes 22 in the plate 20 serve as the only holes for receiving hooks or other supplemental fasteners extending from the towed vehicle. Otherwise, the hitch receiver unit 140 is configured the same, and used the same, as described above for receiver unit 40. Note that, in certain embodiments, the lower plate 62 of the bracket 60 could be shaped differently and/or adapted to extend/connect integrally with the plate 20, and in such cases, one might not see the lines of demarcation between lower plate 62 and plate 20 that appear in FIGS. 8-11. Therefore, an integral step plate could be formed with the receiver, rather than being welded on as a retrofit.

Figure 12:
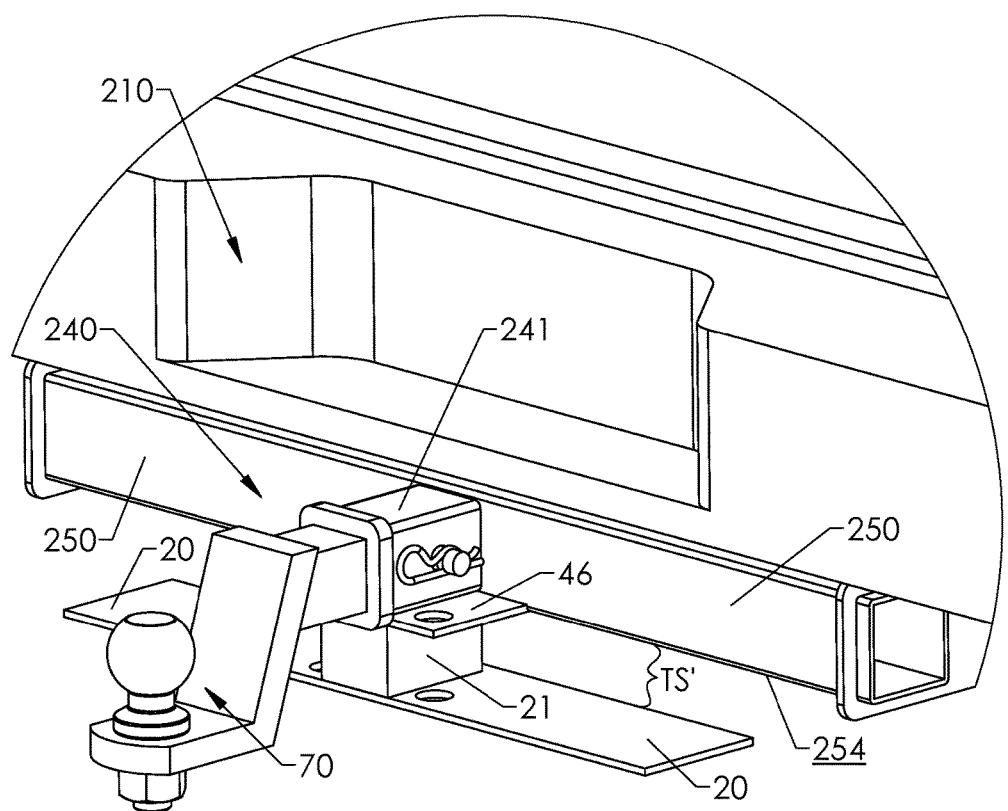
FIG. 12 is a rear perspective view of an alternative embodiment of the step and hitch receiver assembly, installed on a pickup truck and combined with a ball unit, wherein the hitch receiver includes a cross-member, and wherein an extension member or other spacer is used to lower the step plate to create toe space between the plate and the cross-member.
Figure 13:
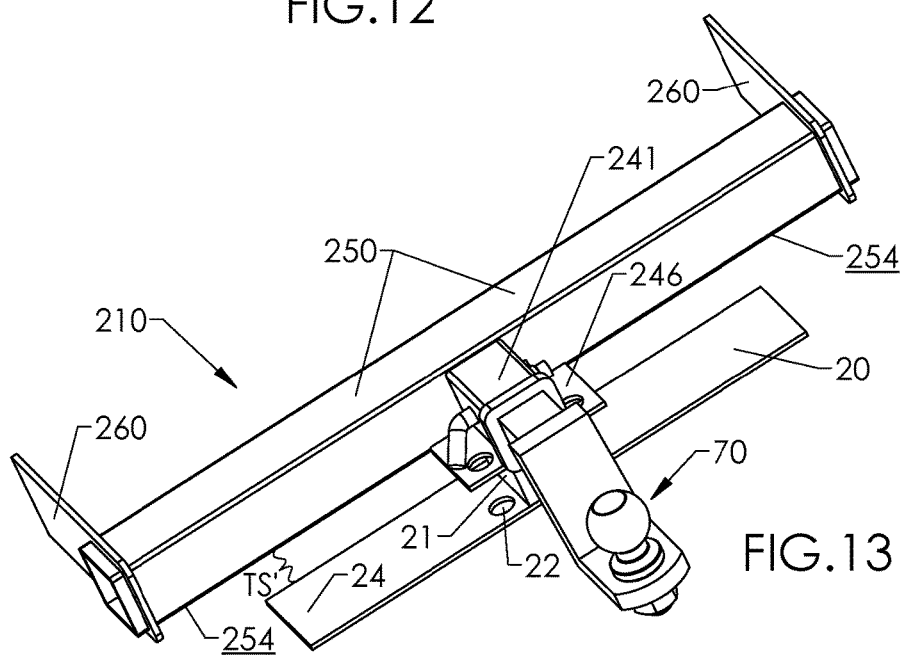
FIG. 13 is a top perspective view of the embodiment of FIG. 12 combined with the ball unit, but removed from the pickup truck.

The preferred embodiments 10, 110, comprising receiver units 40, 140 and step plate 20, shown in FIGS. 1-11, are a retrofit model and an OEM model, for a common type of receiver hitch that may be described as consisting essentially of a longitudinal receiver tube, and a bracket to fix the receiver tube to the vehicle/truck, and conventional tabs and/or holes to receive/hold hooks/fasteners. Another receiver hitch type comprises, in addition to the longitudinal receiver tube and tabs/holes to receive/hold hooks/fasteners, a receiver unit 240 that includes a cross-member 250, and alternative bracket(s) 260 for connection to the vehicle/truck, as shown by the step and receiver assembly 210 in FIGS. 12 and 13.

Regarding the step and receiver assembly 210, the structure and function of the longitudinal receiver tube 241 is the same or very similar as that for tube 41, as will be understood by those of skill in the art after reviewing the discussion above, and the figures. The main difference in this embodiment 210 pertaining to the step plate 20 is that a spacer 21 is provided between the bottom surface of the receiver tube 241 and the top surface of the plate 20, in order to lower the step plate 20 slightly below the bottom surface of the tube 241. Therefore, this spacer 21 is advantageous in providing a toe space TS' between the top surface 24 and the bottom surface 254 of the cross-member. The cross-member 250 is typically located directly below, and close to, the bottom surface 94 of the bumper 90, so that there is no space, and particularly no room for toe space, between the cross-member 250 and the bottom surface 94 of the bumper. Therefore, to provide toe space TS' between the top surface 24 of the plate 20 and the bottom surface 254 of the cross-member 250, the spacer 21 lowers the plate several inches from the bottom surface of the receiver tube 241, to provide that space TS'.

The spacer 21 preferably lowers the plate only a distance of 2-5 inches, and more preferably 3-4 inches, relative to the step plate's position in embodiments 10, 110. This lowering distance provides a tow space TS' of 2-5 inches, and more preferably 3-4 inches, between the bottom surface 254 and the top surface 24, but is not such a great lowering that it substantially reduces the comfort and effectiveness of use of the step 20 by a user wanting to climb into the truck bed. Thus, the features, use, and benefits of step 20 in the step and receiver assemblies 10, 110, may be understood to apply generally or specifically to the step and receiver assembly 210.

The single rigid step plate (20), extending continuously under the receiver tube and contacting the entire bottom surface of the receiver tube forward of the rim, is preferred for strength, and, in the case of a welded connection to the receiver tube, for ease of alignment with the tube and ease of welding. However, alternatively, two rigid plates may be provided, one extending right out away from the right side of the tube, and one extending left out away from the right side of the tube, without the two plates being integral with each other or attached directly to other. In such embodiments, the two step plates or "step plate portions" should be parallel to each other and co-planar, and should be very securely fixed to the receiver tube, for durability, reliability, safety and consistency of use of the right and left sides of the step system. The other aspects, in terms of step plate position relative to the tabs, the bracket, and the bumper, including the provision of the desired toe space described above, preferably do not change. The features of having the plate portions underneath the tabs, having holes aligning with the holes of the tabs, and having the right and left plate portions extend a substantial distance to the right and left, preferably do not change. Having the entirety of the step plate below the receiver tube forward of the tube rim, translates to the entirety of the two plates being below the receiver tube forward of the tube rim. Each of the two plates may extend out from its respective side of the receiver tube a distance in the range of 9-24 inches, more preferably 10-20 inches, and most preferably 12-18 inches. The total surface area of the two plates available for receiving the user's foot is preferably more than 300 square inches, and even in the range of 300-500 square inches in some embodiments, as in the case of a single step plate.

In the specification and drawings of this Application, reference is made to particular features (including method steps) of certain embodiments. It is to be understood that the disclosure of the invention includes all possible combinations of such particular features. For example, where a particular feature is disclosed in the context of a particular aspect, a particular embodiment, or a particular Figure, that feature can also be used, to the extent appropriate, in the context of other particular aspects, embodiments, and Figures, and in the invention generally. For example, many features and operation steps of embodiment 10 will be understood to apply to step and receiver assembly embodiment 110, and also to step and receiver assembly embodiment 210, though not detailed specifically above for embodiments 110 or 210, as will be understood from this paragraph. Further, while embodiments of the invention have been described above with reference to particular means, materials and embodiments, it is to be understood that the invention is not necessarily limited to these disclosed particulars, but extends instead to all equivalents within the broad scope of this disclosure, including the text of this document, the drawings, and the following claims.

The invention claimed is:

1. A receiver hitch system for increasing safety when a user climbs into a truck bed, the system comprising:
  a towing receiver unit for being connected to a truck, the receiver unit comprising a receiver tube having an interior space and a longitudinal axis for being parallel to a longitudinal axis of the truck, the receiver tube further having a right outer side, a left outer side, a top outer side, and a bottom outer side having a bottom surface;
  a step plate fixed to the bottom surface of the receiver tube and extending out past the right outer side and also out past the left outer side of the receiver tube, so that the step plate is horizontal and has a width, transverse to the longitudinal axis of the receiver tube, that is centered relative to the receiver tube;
  wherein the receiver unit further comprises two tabs extending from the receiver tube and each comprising a top surface, a bottom surface, and a hole from the top surface to the bottom surface for receiving a hook, the step plate being fixed to the bottom surface of each of the tabs.

2. The hitch system as in claim 1, wherein the step plate is a single plate that extends continuously underneath the receiver tube.

3. The hitch system as in claim 1, wherein the step plate has two through-holes that align with the holes in the tabs.

4. The hitch system as in claim 1, wherein the step plate is entirely below the receiver tube.

5. The hitch system as in claim 1, wherein the step plate is entirely below the receiver tube and the tabs.

6. The hitch system as in claim 1, wherein the receiver unit further comprises a rim at a rearward end of the receiver tube and surrounding and forming an opening into the receiver interior space, and the step plate is entirely below the receiver tube forward of the rim.

7. The hitch system as in claim 1, wherein the step plate is welded to the bottom surface of the receiver tube.

8. The hitch system as in claim 1, wherein the step plate is welded to the bottom surface of the receiver tube and the bottom surface of the tabs.

9. The hitch system as in claim 1, wherein the step plate is integrally formed with the bottom surface of the receiver tube.

10. The hitch system as in claim 1, further comprising a ball unit removably received in the receiver tube, wherein the step plate is not attached to and does not touch the ball unit.

11. The hitch system as in claim 1, wherein the step plate is a continuous, solid plate having a planar top surface, the plate being greater than 20 times wider than thick, and the plate greater than 10 times longer than thick.

12. A truck receiver hitch system for increasing safety when a user climbs into a truck bed, the system comprising:
   a truck with a rear end having a rear bumper comprising a bottommost bumper surface;
   a towing receiver unit comprising a receiver tube having an interior space and a longitudinal axis that is parallel to a longitudinal axis of the truck, the receiver tube further having a right outer side, a left outer side, a top outer side, and a bottom outer side having a bottom surface, and a bracket connecting the receiving unit to the truck at the back end under the bumper bottommost bumper surface;
   a step plate fixed to the bottom surface of the receiver tube and extending out past the right outer side and also out past the left outer side of the receiver tube, so that the step plate is horizontal and has a width transverse to the longitudinal axis of the receiver tube;
   wherein the step plate extends forward under the bumper, and the step plate has a top surface that is vertically spaced from the bottommost bumper surface to form a toe space between the step plate and the bumper for receiving a user's foot or shoe toe;
   wherein the receiver unit further comprises two tabs extending from the receiver tube and each comprising a top surface, a bottom surface, and a hole from the top surface to the bottom surface for receiving a hook, the step plate being fixed to the bottom surface of each of the tabs.

13. The truck receiver hitch system as in claim 12, wherein the toe space is about 4 vertical inches.

14. The truck receiver hitch system as in claim 13, wherein the step plate is entirely below the receiver tube.

15. The truck receiver hitch system as in claim 12, wherein the receiver unit further comprises a rim at a rear end of the receiver tube that defines an opening into an interior space of the receiver tube, the step plate is a single plate that extends continuously underneath the receiver tube in front of the rim.

16. The truck receiver hitch system as in claim 15, wherein the step plate is entirely below the receiver tube forward of the rim.

17. The truck receiver hitch system as in claim 12, wherein the step plate has two through-holes that align with the holes in the tabs.

18. The truck receiver hitch system as in claim 12, wherein the step plate is entirely below the receiver tube and the tabs.

19. The truck receiver hitch system as in claim 12, wherein the step plate is welded to the bottom surface of the receiver tube.

20. The truck receiver hitch system as in claim 12, wherein the step plate is welded to the bottom surface of the receiver tube and the bottom surface of the tabs.

21. The truck receiver hitch system as in claim 12, wherein the step plate is integrally formed with the bottom surface of the receiver tube.

22. The truck receiver hitch system as in claim 12, further comprising a ball unit removably received in the receiver tube, wherein the step plate is not attached to and does not touch the ball unit.

23. The truck receiver hitch system as in claim 12, wherein the step plate is a continuous, solid plate having a planar top surface, the plate being greater than 20 times wider than thick, and the plate being greater than 10 times longer than thick.

\* \* \* \* \*